United States Patent
Lema et al.

(10) Patent No.: US 9,962,615 B2
(45) Date of Patent: May 8, 2018

(54) INTEGRATED MULTI ENVIRONMENT INTERACTIVE BATTLE GAME

(71) Applicant: Hasbro, Inc., Pawtucket, RI (US)

(72) Inventors: James Lema, Attleboro, MA (US);
Daizo Uehara, Easton, MA (US);
Daniel Judkins, Providence, RI (US);
Craig Desrosiers, Attleboro Falls, MA (US)

(73) Assignee: Hasbro, Inc., Pawtucket, RI (US)

( * ) Notice: Subject to any disclaimer, the term of this patent is extended or adjusted under 35 U.S.C. 154(b) by 99 days.

(21) Appl. No.: 14/812,727

(22) Filed: Jul. 29, 2015

(65) Prior Publication Data
US 2016/0030848 A1 Feb. 4, 2016

Related U.S. Application Data

(60) Provisional application No. 62/031,014, filed on Jul. 30, 2014.

(51) Int. Cl.

| | |
|---|---|
| *A63F 13/825* | (2014.01) |
| *A63F 13/213* | (2014.01) |
| *A63F 13/69* | (2014.01) |
| *A63F 13/73* | (2014.01) |
| *G07F 17/32* | (2006.01) |
| *A63F 9/24* | (2006.01) |
| *A63F 13/215* | (2014.01) |
| *A63F 13/216* | (2014.01) |
| *A63F 13/85* | (2014.01) |
| *A63F 13/95* | (2014.01) |

(Continued)

(52) U.S. Cl.
CPC .............. *A63F 13/825* (2014.09); *A63F 9/16* (2013.01); *A63F 9/24* (2013.01); *A63F 13/213* (2014.09); *A63F 13/215* (2014.09); *A63F 13/216* (2014.09); *A63F 13/69* (2014.09); *A63F 13/73* (2014.09); *A63F 13/85* (2014.09); *A63F 13/95* (2014.09); *A63H 1/00* (2013.01); *G07F 17/323* (2013.01); *G07F 17/3206* (2013.01); *G07F 17/3209* (2013.01); *G07F 17/3216* (2013.01); *A63F 13/46* (2014.09); *A63F 13/67* (2014.09); *A63F 2009/2435* (2013.01); *A63F 2009/2447* (2013.01); *A63H 2200/00* (2013.01)

(58) Field of Classification Search
CPC ...... A63F 13/825; A63F 13/213; A63F 13/69; A63F 13/73; G07F 17/3206; G07F 17/3209; G07F 17/3216; G07F 17/323
See application file for complete search history.

(56) References Cited

U.S. PATENT DOCUMENTS

| | | |
|---|---|---|
| 3,875,456 A | 4/1975 | Kano et al. |
| 4,493,219 A | 1/1985 | Sharp et al. |

(Continued)

*Primary Examiner* — William H McCulloch, Jr.
*Assistant Examiner* — Yingchuan Zhang
(74) *Attorney, Agent, or Firm* — Perry Hoffman

(57) ABSTRACT

Gaming systems and methods for integrated computer-related and physical game play interactions between a game player, a physical game piece and an electronic device are defined. The physical game piece transmits a unique alphanumeric identifier to an electronic device game application while the game application either waits to receive a recognized unique alphanumeric identifier before switching to a video game where a character battles and waits to receive a recognized unique alphanumeric identifier before switching back to the waiting state.

20 Claims, 13 Drawing Sheets

(51) Int. Cl.
   *A63F 9/16*   (2006.01)
   *A63H 1/00*   (2006.01)
   *A63F 13/46*   (2014.01)
   *A63F 13/67*   (2014.01)

(56) References Cited

U.S. PATENT DOCUMENTS

| | | |
|---|---|---|
| 4,989,881 A | 2/1991 | Gamble |
| 5,102,131 A | 4/1992 | Remington |
| 5,305,013 A | 4/1994 | Daniels |
| 5,746,602 A | 5/1998 | Kikinis |
| 5,752,880 A | 5/1998 | Gabai et al. |
| 5,864,333 A | 1/1999 | O'Heir |
| 5,947,846 A | 9/1999 | Craig |
| 5,971,855 A | 10/1999 | Ng |
| 5,976,038 A | 11/1999 | Orenstein et al. |
| 6,016,038 A | 1/2000 | Mueller et al. |
| 6,022,273 A | 2/2000 | Gabai et al. |
| 6,024,675 A | 2/2000 | Kashiwaguchi |
| 6,075,195 A | 6/2000 | Gabai et al. |
| 6,149,490 A | 11/2000 | Hampton et al. |
| 6,150,774 A | 11/2000 | Mueller et al. |
| 6,160,986 A | 12/2000 | Gabai et al. |
| 6,164,973 A | 12/2000 | Macri et al. |
| 6,184,865 B1 | 2/2001 | Zimmerman et al. |
| 6,206,745 B1 | 3/2001 | Gabai et al. |
| 6,213,872 B1 | 4/2001 | Harada et al. |
| 6,257,948 B1 | 7/2001 | Silva |
| 6,290,565 B1 * | 9/2001 | Galyean, III ............ A63H 3/16 273/148 B |
| 6,290,566 B1 | 9/2001 | Gabai et al. |
| 6,319,010 B1 | 11/2001 | Kikinis |
| 6,352,478 B1 | 3/2002 | Gabai et al. |
| 6,356,867 B1 | 3/2002 | Gabai et al. |
| 6,368,177 B1 | 4/2002 | Gabai et al. |
| 6,514,117 B1 | 2/2003 | Hampton et al. |
| 6,544,098 B1 | 4/2003 | Hampton et al. |
| 6,585,622 B1 | 7/2003 | Shum et al. |
| 6,773,322 B2 | 8/2004 | Gabai et al. |
| 6,773,344 B1 | 8/2004 | Gabai et al. |
| 6,888,322 B2 | 5/2005 | Dowling et al. |
| 6,959,166 B1 | 10/2005 | Gabai et al. |
| 6,997,772 B2 | 2/2006 | Fong |
| 7,314,407 B1 | 1/2008 | Pearson |
| 7,454,002 B1 | 11/2008 | Gardner et al. |
| 7,862,428 B2 | 1/2011 | Borge |
| 7,902,840 B2 | 3/2011 | Zachut et al. |
| 7,927,253 B2 | 4/2011 | Vincent et al. |
| 7,946,493 B2 | 5/2011 | Havens et al. |
| 7,993,201 B2 | 8/2011 | Matsumoto et al. |
| 8,199,114 B1 | 6/2012 | Jaeger |
| 8,261,992 B2 | 9/2012 | Havens et al. |
| 8,272,945 B2 | 9/2012 | Kelly et al. |
| 8,323,068 B2 | 12/2012 | Ganetakos et al. |
| 8,337,271 B2 | 12/2012 | Campbell et al. |
| 8,353,770 B2 | 1/2013 | Lu |
| 8,358,286 B2 | 1/2013 | Cannon |
| 8,368,662 B2 | 2/2013 | Argiro |
| 8,401,343 B2 | 3/2013 | Braun |
| 8,838,471 B1 | 9/2014 | Shum et al. |
| 2002/0193045 A1 | 12/2002 | Lee et al. |
| 2004/0248650 A1 | 12/2004 | Colbert et al. |
| 2005/0227811 A1 | 10/2005 | Shum et al. |
| 2006/0255149 A1 | 11/2006 | Retter et al. |
| 2006/0256090 A1 | 11/2006 | Huppi |
| 2007/0062852 A1 | 3/2007 | Zachut et al. |
| 2009/0027359 A1 | 1/2009 | Wong et al. |
| 2009/0048020 A1 | 2/2009 | Gruen et al. |
| 2009/0115133 A1 | 5/2009 | Kelly et al. |
| 2009/0118001 A1 | 5/2009 | Kelly et al. |
| 2009/0124379 A1 | 5/2009 | Wells |
| 2009/0131134 A1 | 5/2009 | Baerlocher et al. |
| 2011/0086692 A1 | 4/2011 | Guziel |
| 2011/0165933 A1 | 7/2011 | Guziel et al. |
| 2011/0227871 A1 | 9/2011 | Cannon |
| 2012/0050198 A1 | 3/2012 | Cannon |
| 2012/0142429 A1 * | 6/2012 | Muller .................... A63F 13/12 463/42 |
| 2012/0190455 A1 | 7/2012 | Briggs |
| 2012/0194457 A1 | 8/2012 | Cannon |
| 2012/0244939 A1 | 9/2012 | Braun |
| 2013/0012313 A1 | 1/2013 | Chen |
| 2013/0017891 A1 | 1/2013 | Romero et al. |
| 2013/0079139 A1 | 3/2013 | Gray |
| 2013/0127911 A1 | 5/2013 | Brown |
| 2013/0130779 A1 | 5/2013 | Gagner et al. |
| 2013/0181927 A1 | 7/2013 | Madonna et al. |
| 2013/0217482 A1 * | 8/2013 | Kelly ...................... A63F 3/081 463/26 |
| 2015/0024852 A1 * | 1/2015 | Pacey ..................... A63F 13/67 463/43 |
| 2016/0166924 A1 * | 6/2016 | Leyland ................. A63F 13/02 463/31 |

* cited by examiner

| LEADER BOARDS | | | | | | |
|---|---|---|---|---|---|---|
| RANK | LEVEL | PLAYER NAME | SCORE | KILLS | DEATHS | RATIO |
| 1 | 33 | MEGARACER | 150750 | 3015 | 1847 | 1.63 |
| 1 | 33 | MEGARACER | 150750 | 3015 | 1847 | 1.63 |
| 2 | 33 | YKEminance | 146350 | 2027 | 1338 | 2.19 |
| 3 | 27 | M Armyat | 108700 | 2174 | 1337 | 1.63 |
| 4 | 34 | aXis Ranger | 103100 | 2062 | 558 | 3.69 |
| 5 | 26 | Risql | 101600 | 2032 | 1000 | 1.22 |
| 6 | 23 | Apple Bloom no | 97300 | 1946 | 958 | 1.43 |
| 7 | 27 | TcWHK | 96200 | 1924 | 1344 | 2.14 |
| 8 | 23 | Armazla | 96000 | 1920 | 895 | 2.08 |
| 9 | 43 | Tah Balass | 90800 | 1916 | 885 | |

256

| LEADER BOARDS | | | | | | |
|---|---|---|---|---|---|---|
| RANK | LEVEL | PLAYER NAME | WINS | LOSSES | RATIO | STREAK |
| 4452 | 21 | HG cLuTche | 470 | 65 | 7.23 | 104 |
| 4452 | 21 | HG cLuTche | 470 | 65 | 7.23 | 104 |
| 19367 | 43 | Cry Tea Ducksess | 333 | 45 | 7.08 | 107 |
| 44657 | 51 | HG Instinct | 255 | 73 | 3.64 | 25 |

258

260

INTEGRATED MULTI ENVIRONMENT INTERACTIVE BATTLE GAME

CROSS-REFERENCE TO RELATED APPLICATIONS

This is a non-provisional patent application which claims priority pursuant to 35 U.S.C. 119(e) to U.S. Provisional Patent Application No. 62/031,014, filed on Jul. 30, 2014, which is expressly incorporated herein by reference.

FIELD OF THE INVENTION

The present invention relates generally to interactive games, and more particularly to game scenarios such as battle-based board games and battle-based videogames used with mobile electronic devices. For example, battle competition may occur for a player or between players during videogame play in a virtual environment and during physical game play in a real environment with physical toys.

BACKGROUND OF THE INVENTION

During the past three decades, videogames have evolved tremendously and have become widely played by people of all ages and abilities. Additionally, recent years have been marked by an explosion in the use of mobile electronic devices, such as smart phones, tablet computers, portable gaming devices and the like. Correspondingly, the popularity of playing videogames on mobile electronic devices has also exploded.

Also in recent years, several prior art videogames, known as endless running games, have become extremely popular. In endless running games, a player begins the game with a certain amount of resources for playing the game, and the game runs until the player exhausts all his or her resources; during the game, the player may increase resource levels through various game play events. Traditionally, these increased resources are earned from within the videogame, for example, by accumulating a certain number of points resulting from videogame play. Thus, the increased resources have been accumulated fully within a virtual environment.

Likewise, several prior art videogames involving battles between characters have also become extremely popular. Many of these videogame battles run on the type of resources discussed above, with these resources accumulated fully within the virtual environment. Additionally, physical board games involving battles have been popular and remain popular. For example, the Beyblade™ brand battling top has been popular for several years and remains popular. The battles between these types of tops have occurred fully within the real environment.

Over the past few decades, systems, devices and methods also have used physical activity measurements as input to computer-related systems, mainly to promote physical activity or particular products. U.S. Pat. No. 8,353,770 to Lu for "Mobile Social Fitness Networked Game" discloses a mobile device where performance data is used for fitness, socialization and potential game playing. Patent application US 2005/0227811 to Shum for "Game Pod" discloses a game pod attachable to footwear that measures physical activity and uses the measurements as input to a videogame. U.S. Pat. No. 6,585,622 to Shum for "Interactive Use an Athletic Performance Monitoring and Reward Method, System and Computer Program Product" discloses a method for rewarding athletic performance involving the use of a product worn by a person. U.S. Pat. No. 6,213,872 to Harada, et al. for "Pedometer with Game Mode" discloses a pedometer with a game mode for a child.

Various sports balls, pucks and the like are known which may contain an electromagnetic transmitter. For example, U.S. Pat. No. 5,976,038 to Orenstein et al. for "Apparatus for detecting moving ball" issued Nov. 2, 1999 discloses an apparatus having a game ball containing a transmitter where antennas are provided for determining whether or not the game ball has passed over a line. Orenstein et al. allows for limited user interaction with illuminating sensors that increase the interactive capabilities of the game. Similarly, the U.S. Pat. No. 5,947,846 to Craig for "Hockey Goal—'The Judge'" issued Sep. 7, 1999 describes a hockey apparatus where sensors detect whether a puck has passed over a housing line. Like Orenstein et al., the Craig patent allows for some user interaction by way of reaction to a puck crossing the line as real-world physical play activities. U.S. Pat. No. 5,864,333 to O'Heir for "Foot Force Actuated Computer Input Apparatus and Method" discloses using shoes, pads, or other similar device to generate control signals corresponding to movement. U.S. Pat. No. 6,024,675 to Kashiwaguchi for "Data-Using Game System" discloses using operational training data produced from a device such as an exercise machine as input for a videogame that is part of the exercise machine.

U.S. Patent Application No. 2013/0017891 A1 to Romero, et al. for "Systems And Methods For Providing Virtual Incentives For Real-World Activities" published Jan. 17, 2013 discloses toys and physical play objects such as sports balls or flying disks that include a sensor to generate signals conveying information regarding the amount of real-world physical play activities performed with the associated object. Romero discloses that once the amount of play crosses a threshold level, its user may be presented with a code, from which the user may redeem virtual benefits and incentives for use in virtual-world videogame environments such that real-world physical activity is encouraged through virtual space benefits.

Because the play of videogames has largely been fueled with battle victories, energy, or points, earned or otherwise accumulated from within the virtual environment of the played game, the enjoyment of the game has been limited. Likewise, because battling games in the physical, real environment have remained fully within the physical, real environment, the enjoyment of those games has also been limited. It would be advantageous to enhance the enjoyment of videogames and real world physical games by providing a battling game that involves a single character persona alternating between the real world environment and the virtual environment during a single battle as well as through multiple battles while providing feedback to the player from each environment. Accordingly, it would be desirable to provide a battling game that involves a single character alternating between battle in the real world environment and battle in a virtual environment. This can be accomplished by producing a physical game piece capable of communicating with and being identified by an application on an electronic device, where the application on the electronic device alternates between battles in the virtual environment and waiting for the virtual character to return following a battle between physical game pieces. The inventions discussed in connection with the described embodiments address these and other deficiencies of the prior art.

The features and advantages of the present inventions will be explained in or apparent from the following description of the preferred embodiment considered together with the accompanying drawings.

SUMMARY OF THE INVENTION

The present inventions address deficiencies in the prior art of integrated computer-related and physical game play interactions by defining a gaming system involving interactions between a player, a physical game piece and an electronic device. Specifically, the described embodiment uses a Beyblade™ spinning top as the physical game piece interacting with an electronic device with which the top may communicate. The described Beyblade™ spinning top usually includes a device, such as a ripcord, to help a player make the top spin. One or more players may engage in games where one or more players spin two or more tops so that the tops may "battle", where the player whose top is the last top spinning wins. The "battle" may include the tops colliding one or more times. The tops may have different designs where each design causes a top to respond to collisions in a unique way, thus adding a skill element to choosing opposing tops.

The electronic device executes a game application associated with the physical game piece. In the described embodiment, the game application has a digital character uniquely associated with a specific Beyblade™. Where each Beyblade™ top has unique physical characteristics, each associated digital character has a personality reflecting the characteristics of the corresponding physical top.

The game application executes as a two-state digital game environment that toggles between each state. In the first state, while the player plays with the physical game piece, the game application waits for communication from the physical game piece. After the game application communicates with the physical game piece, the game application switches to the second state, where the player plays a game in the digital environment. In the second state, the game application also waits for communication from the physical game piece while the player plays the digital game. When the game application communicates with the physical game piece while in the second state, the game application switches to the first state. The first-state digital game environment further may have a display that shows story elements related to the digital character and the digital environment during play with the physical game piece.

In the second state, the game includes a digital character uniquely associated with the physical Beyblade™ top. The player increases an accumulated game score by sequentially accessing gaming modules of increasing difficulty featuring the digital character in the digital game environment. In the embodiment, the player may control the digital character using known user input interfaces, such as a keyboard, a joystick, a touchpad, a trackball, etc. In some embodiments, the digital character evolves as the difficulty level increases.

Each physical game piece, or Beyblade™ top in the described embodiment, has a unique alphanumeric identifier and a signal transmitter, such as near field communication (NFC) device, which transmits the unique alphanumeric identifier. The electronic device has a signal receiver configured to receive the unique alphanumeric identifiers associated with each Beyblade™ top.

The game application, which accesses a table of the known unique alphanumeric identifiers, switches between the first game state and the second state in response to output from a digital portal interface, which runs as part of the game application. The digital portal interface is configured to receive the unique alphanumeric identifiers from the signal receiver in the electronic device, to query the table to match the received unique alphanumeric identifier, and to generate output when the unique alphanumeric identifier matches a table element. When the digital portal generates output, the game application switches states. The player accesses the sequentially accessible gaming program modules and increases the difficulty level and the accumulated game score based on the quantity of digital portal output and the quantity and pattern of user input. The digital portal interface may further be used to generate a friends list using the unique alphanumeric identifiers of the physical game pieces belonging to friends against whom the player competes.

In some embodiments, the game application may further use multipliers as a feature to reward a player for both physical game play and computer-related game play. With multipliers, the value of either the difficulty level or the accumulated game score, or both, gets increased by a predetermined multiple based on the quantity of digital portal output and the quantity and pattern of user input.

The described embodiments may also use a physical game board that communicates with the physical game piece and the game application. In the described embodiment, the physical game board is a used as a stadium for one or more players to spin two or more Beyblade™ tops so that the tops battle within the stadium confines by spinning and knocking into each other until only one top remains spinning. The game board uses a game piece movement detector that identifies the individual tops by receiving and recognizing the unique alphanumeric identifier when the top is within the stadium and that uses a motion sensor to determine if the top is moving while within the stadium. The physical game board also uses a signal transmitter that communicates with the game piece movement detector and transmits the unique alphanumeric identifiers of all tops within the stadium and whether or not each top is moving to the game application in the electronic device. Depending on the types of switches used in the physical top, the game piece movement detector may or may not only be able to identify the top if the top is spinning Other configurations will sense both presence and spinning. Then, the game application in the electronic device may monitor the physical top battles.

In the described embodiment, the game application in the electronic device monitors the Beyblades™ physical battles in the stadium by configuring memory to store a list with each item containing: 1) the unique alphanumeric identifier; 2) a motion indicator that indicates whether or not the physical game piece having the particular unique alphanumeric identifier is moving; 3) the accumulated game score for the physical game piece having the particular unique alphanumeric identifier; and 4) the current difficulty level for the physical game piece having the particular unique alphanumeric identifier. Then, in real time, the game application uses a game piece identification and movement detection program module to detect the tops in the stadium by receiving their respective unique alphanumeric identifiers and to determine whether each top is moving. The game piece identification and movement detection program module then communicates with the game application running in the second state to adjust the accumulated game scores and the difficulty levels associated with each unique alphanumeric identifier. The unique alphanumeric identifiers, the motion indicators corresponding to each unique alphanumeric identifier, the accumulated game scores corresponding to each unique alphanumeric identifier, and the current difficulty level for the physical game piece having the particular unique alphanumeric identifier are written back to the list for real time monitoring. This battle monitoring is further enhanced by a user interface that allows a user to input game results and associate the game result with a unique alphanumeric identifier and by a game result conversion program module that translates the input game results into additional points to add to the accumulated game score associated with each top.

A remotely connected network-based gaming system management program module may provide network-wide user difficulty level and accumulated game score management for users of like gaming systems. The multiplier described above may be used network-wide. The network may further allow players to make in-application purchases using money or currency earned during game play. For example, the user may use points in the accumulated game score as a currency to purchase game elements for the digital character to use in the digital environment, and, further, the user may further earn a second currency from increasing difficulty levels. The network-based gaming system management program may further have an account management tool that allows network users to open an account so the electronic device from one gaming system may recognize the physical game piece of a different gaming system.

BRIEF DESCRIPTION OF THE DRAWINGS

The inventions will now be more particularly described by way of example with reference to the accompanying drawings, the advantages of which may be best understood with reference to the following detailed description taken in conjunction with the drawing figures, in which.

Figure 1A:
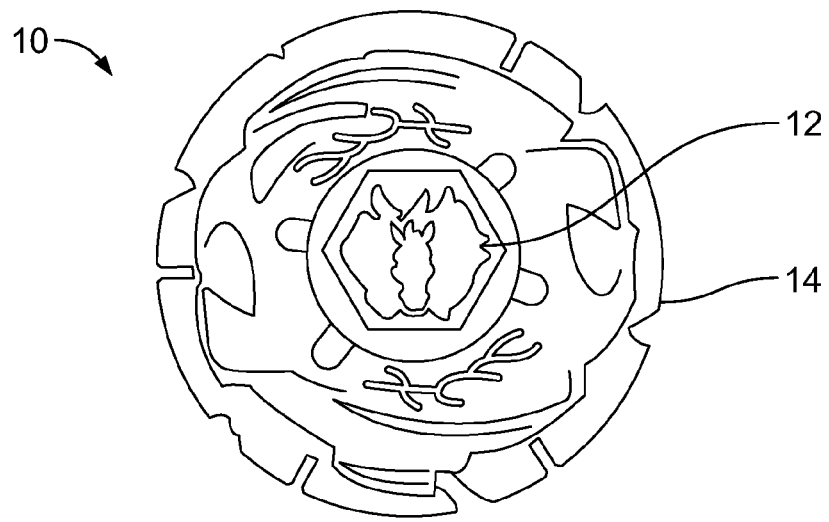
FIG. 1A shows an overhead view of a physical toy top.

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

DETAILED DESCRIPTION OF THE EMBODIMENTS

A described embodiment is a game ecosystem with several components. The game ecosystem and its advantages may be understood by the following detailed description of various elements of the system taken in conjunction with the accompanying figures.

Embodiments include gaming systems and methods for integrated computer-related and physical game play interactions having a physical game piece and an electronic device. The physical game piece may be a physical toy top, such as the aforementioned Beyblade™. The electronic device may be a tablet computer, a smart phone, a laptop computer or the like.

The play pattern of the described embodiments focuses on increasing the play level of a virtual character within a videogame on the electronic device. All physical tops have near field communication (NFC) capabilities, or some similar communications means, and all electronic devices are responsive to NFC, or some similar communications means. Each NFC enabled top will have a unique alphanumeric identifier to identify its unique "Spirit", or character. For example, Pegasus12345, PegasusABCDE, and Pegasus1B3C4D each represent a unique Spirit or character that will appear in a videogame app on the electronic device. The game ecosystem will use NFC to identify the character associated with the top having the unique alphanumeric identifier by having the game player tap the NFC enabled top on the surface of the NFC enabled electronic device. The electronic device will recognize the unique alphanumeric identifier and identify the correct Spirit, or character, in the game app on the electronic device. Once the electronic device recognizes the physical top, if the player has registered the physical top, the videogame app on the electronic device will be able to display the character as part of the game. This recognition process simulates the transfer of the Spirit from the top in the real world to the videogame in the virtual world.

When the player registers the top, the player will learn that the Spirit character must battle. Battling occurs within two environments: 1) the virtual, or digital, gaming environment; and 2) the physical environment. The player will choose which Spirit he or she wants to use for a battle. When ready, the player will battle digitally to receive currency in the form of "gems" and "points". The currency will allow the player to level up and the spirit to evolve within the videogame. Leveling up and evolving digitally will take a relatively long time. The player will also be able to level up and the spirit will be able to evolve in the physical environment. Leveling up and evolving in the physical environment will take less time than in the digital environment.

During the virtual, or digital, experience with the spirit, or character, the videogame app will inform the player that the player must battle with the spirit in the physical world. The videogame app will instruct the player to release the spirit from the virtual world through a portal and into the physical top. Once the player taps the NFC enabled top on the surface of the NFC enabled electronic device, the spirit will be able to compete in top-to-top battles in the real world. The videogame app will then prompt the player that the spirit cannot battle in the virtual world again until the player performs the tapping process described above.

FIG. 1A shows an overhead view of a physical toy top. The physical toy top may be constructed from any material suitable for the top to withstand colliding with another top of the same or similar material spinning at a high rate. The physical top 10 embodies a particular spirit, or character, identified by the spirit/character symbol 12. The described embodiment allows for one to any number of spirit/character symbols 12 as long as each spirit/character symbol 12 is represented by a virtual spirit/character in the videogame app. The crown of the physical top 14 is the part of the spinning physical top 10 that collides with other spinning physical tops 10. Although the physical design of the crown of the physical top 14 shown is randomly and irregularly notched, any design suitable for fair competition between spinning tops may be used. The described embodiment has several designs and colors for the crown of the physical top 14 and provides for greater excitement and unpredictability in battles because of the greater number of possible collisions scenarios. Additionally, the part of the toy featuring the spirit/character symbol 12 may be separate and detachable from the part of the toy featuring the crown of the physical top 14, which may be detachable from the remainder of the physical top 10. Thus, the physical tops 10 in the described embodiments are extremely customizable.

Not shown in FIG. 1A, the physical top 10 has an NFC module that may communicate a unique alphanumeric identification number to an NFC equipped electronic device. Thus, even if the two different physical tops 10 have the same spirit/character symbol 12 and the same crown of the physical top 14, each will be uniquely identifiable to a videogame application running on an NFC equipped electronic device. Other protocols besides NFC may be used.

Figure 1B:
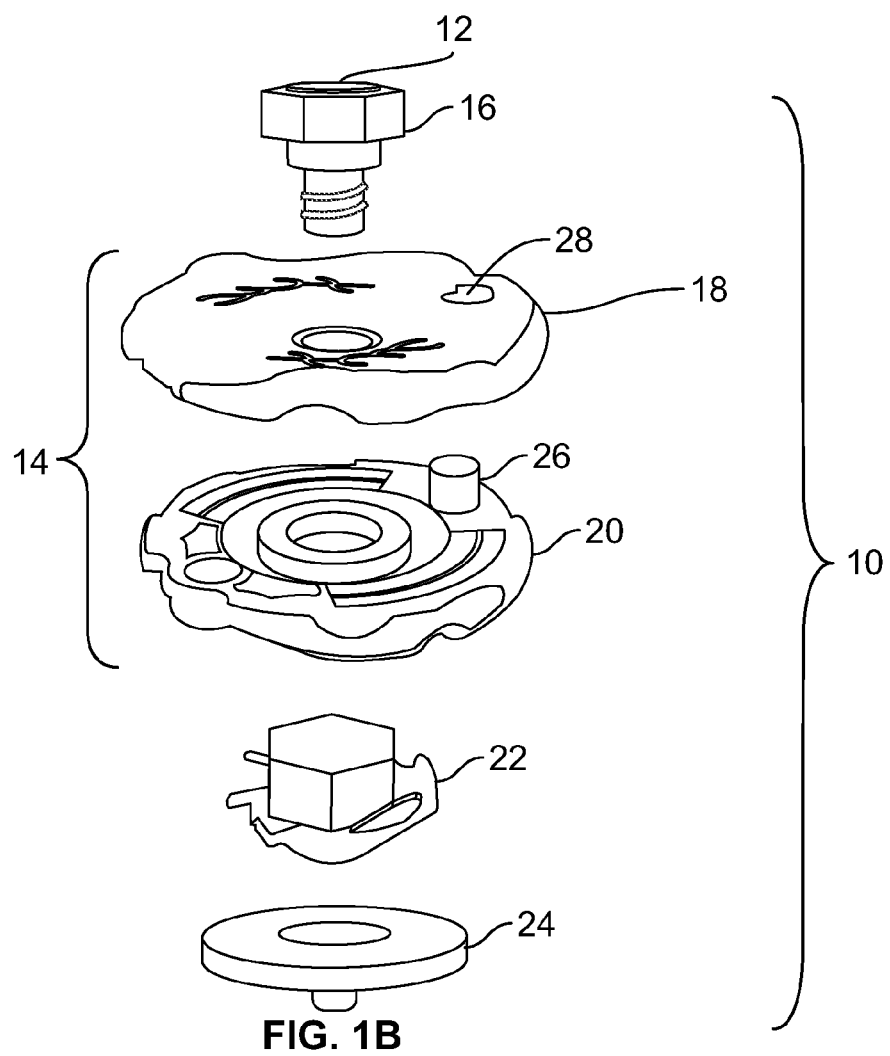
FIG. 1B shows an exploded view of the physical toy top shown in FIG. 1A.

FIG. 1B shows an exploded view of the physical toy top shown in FIG. 1A. The crown nut 16 in the described embodiment is shown as a standard nut, which may be made of plastic, metal or any suitably durable material, although any design capable of attaching to a crown of the physical top 14 defined with reference to FIG. 1A may be used. The crown nut 16 contains the spirit/character symbol 12 described in FIG. 1A on its top side. The crown of the physical top 14 from FIG. 1A is shown in FIG. 1B as a two-piece design, although other designs may be used. The crown of the physical top 14 is composed of a crown battle shield 18 and a crown support 20 that attach to each other. FIG. 1B shows a configuration where a crown support post 26 on the crown support 20 fits snugly into a crown battle shield hole 28 on the crown battle shield 18, although other configurations are possible. In the described embodiment, the physical top 10 may be customized by swapping one crown nut 16 with another and one crown battle shield 18 with another without dismantling the remainder of the physical top 10 for customization.

Also in the described embodiment, the crown nut 16, the crown battle shield 18 and the crown support 20 fit together to form a single piece, which are fully customizable and may appear in various forms. As shown further in FIG. 1B, the crown of the physical top 14 attaches to a point 24 with an NFC module 22 sandwiched between the crown of the physical top 14 and the point 24. Thus, the crown nut 16, the crown of the physical top 14, the NFC module 22, and the point 24 snap together to form the physical top 10. In the described embodiment, the NFC module 22 may be activated by a centrifugal switch so that spinning may be detected. In some games involving battle between tops, some tops will break apart after colliding with another top. A "broken" top may be considered out of the competition, and, thus, should not produce an NFC signal. Therefore, in the described embodiment, the NFC module 22 may additionally, or alternatively, be activated by an assembly contact switch that provides a closed circuit and an NFC signal when a physical top 14 is fully assembled and that provides an open circuit and no NFC signal when the physical top 14 has broken apart. Other activation means may be used.

Figure 2A:
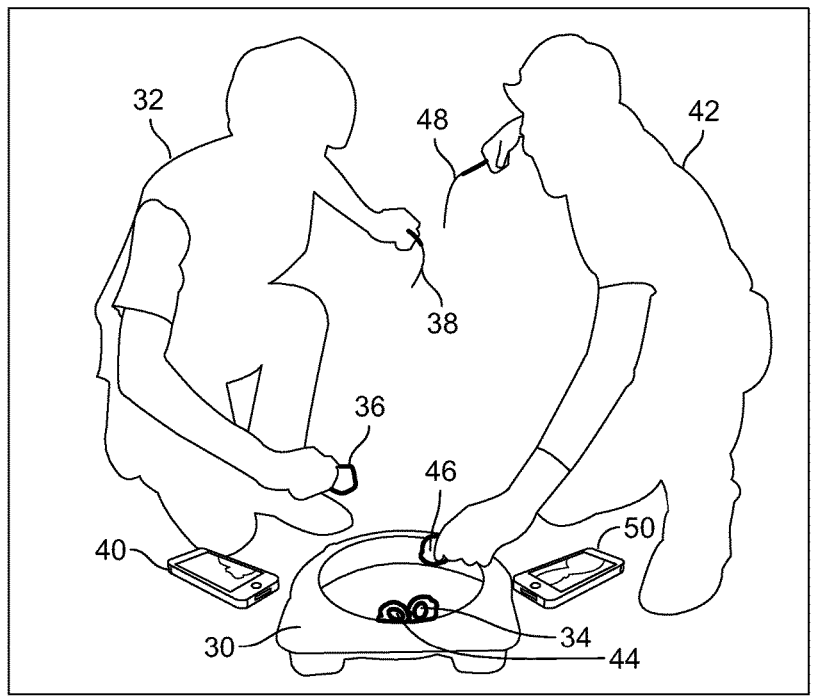
FIG. 2A shows a perspective view of two players, each with electronic devices, playing a battling game using four physical toy tops and a stadium-shaped game board.

FIG. 2A shows a perspective view of two players, each with electronic devices, playing a battling game using four physical toy tops and a stadium-shaped game board. In the described embodiments, a battle using a multiplicity of physical toy tops occurs in a stadium-shaped game board 30. FIG. 2A shows that the first player 32 has spun one battling physical top 34, which is spinning in the stadium-shaped game board 30. The first player 32 is also shown holding a wound physical top 36, which has been wound using the ripcord 38 so that the wound physical top 36 is gyrating and will spin when placed on a the surface of the stadium-shaped game board 30. The first player's electronic device 40 sits in close proximity to the first player 32 so that the first player 32 may see and hear the videogame app running on the first player's electronic device 40.

Likewise, FIG. 2A shows that the second player 42 has spun one battling physical top 44, which is spinning in the stadium-shaped game board 30. The second player 42 is also shown holding a wound physical top 46, which has been wound using the ripcord 48 so that the wound physical top 46 is gyrating and will spin when placed on a the surface of the stadium-shaped game board 30. The second player's electronic device 50 sits in close proximity to the second player 42 so that the second player 42 may see and hear the videogame app running on the second player's electronic device 50. The stadium-shaped game board 30 may be further identified, uniquely identifiable, or redeemable either through digital connectivity, with a slip sheet insert, or using a communicated or printed code.

In scenarios like that in FIG. 2A, the battling physical top 34, the battling physical top 44, the wound physical top 36, the wound physical top 46, the stadium-shaped game board 30, the first player's electronic device 40 and the second player's electronic device 50 are all NFC equipped and are capable of recognizing each other, which may be subject to activation by registration in some described embodiments. Other protocols may be used. For example, the first player 32 has purchased the battling physical top 34 and the wound physical top 36 and registered them to an account associated with the first player 32 and a videogame app running on the first player's electronic device 40. Similarly, the second player 42 has purchased the battling physical top 44 and the wound physical top 46 and registered them to an account associated with the second player 42 and a videogame app running on the second player's electronic device 50.

In this example, because each NFC equipped physical top has a unique alphanumeric identification number that it communicates to each player's NFC equipped electronic devices, the videogame application on each player's electronic device may sense which battling physical tops belong to the player whose account is associated with that player's electronic device and which battling physical tops belong to the opposing player. Thus, the videogame application for a particular player may keep track of the opponents' identities against whom that particular player has battled. Each videogame application may further offer a user input interface to allow each player to enter who won each battle.

In some embodiments, as noted above, the NFC module in a physical top may be activated by a centrifugal switch so that spinning may be detected and/or an assembly contact switch so that a fully assembled top may be detected. In these embodiments, the videogame application on each player's electronic device may be programmed to know that a particular physical top has stopped spinning because the videogame application is no longer receiving the physical top's unique alphanumeric identification number because of rotation or because the physical top has broken apart. In these embodiments, the videogame application may automatically calculate who has won by the last top spinning, as well as calculate battle standings and related statistics. For purposes of the described embodiment, a physical top that has broken apart is no longer spinning.

It should be noted that FIG. 2A features physical tops that begin gyrating internally when energy is transferred to the top from a player pulling a ripcord. This configuration allows the player to hold a top that is gyrating internally and to place the top onto a surface so the top will spin without the top losing much energy. While this form of a physical top may be desirable in many embodiments, the described manner of spinning the top is not meant to be limiting, and other means of spinning the physical tops are possible, and means other than receiving NFC from spinning may be used, such as means using an assembly contact switch as described above.

Figure 2B:
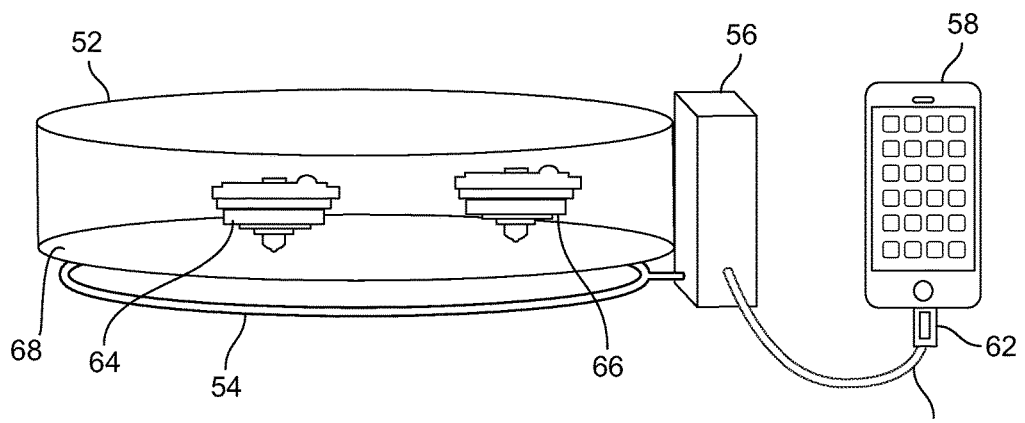
FIG. 2B shows a transparent plan view from the side of a stadium-shaped game board.

FIG. 2B shows a transparent plan view from the side of a stadium-shaped game board. In this particular embodiment, the battle arena is an NFC equipped stadium game board 52 with an NFC reader antenna 54 proximate the NFC equipped stadium game board 52 such that the NFC reader antenna 54 will detect a spinning top within the NFC equipped stadium game board 52. The stadium electronics 56 inputs signals from the NFC reader antenna 54 and receives the unique alphanumeric identifier only for tops within the NFC equipped stadium game board 52. In tops where a centrifugal switch enables an NFC read only for spinning tops, the stadium electronics 56 will start detecting spinning tops when placed within the NFC equipped stadium game board 52 and stop detecting a top when the top stops spinning within the NFC equipped stadium game board 52 or exits while spinning. In tops where an assembly contact switch enables an NFC read only for assembled tops, the stadium electronics 56 will start detecting assembled tops when placed within the NFC equipped stadium game board 52 and stop detecting a top when the top stops breaks apart within the NFC equipped stadium game board 52 or exits while spinning.

The stadium electronics 56 communicates in real time with a videogame app on an electronic device 58 by sending the unique alphanumeric identifiers of the tops spinning within the NFC equipped stadium game board 52 to the videogame app through a wired connection 60 plugged into the headphone jack 62 of the electronic device 58. Although this connection is shown as wired, wireless connections may also be used. This way, from real time data, the videogame app can determine the order in which the spinning tops stop and thus determine a winner and the finishing positions of all the competitors. For example, in FIG. 2B, the first player top 64 and the second player top 66 may be placed onto the stadium playing surface 68, where each top will spin and emit its unique alphanumeric identifier and continue to emit the identifier while spinning Meanwhile, the data from the spinning tops will go through the stadium electronics 56 to the electronic device 58, where the videogame app will track the battle until all tops have stopped spinning. Then, the videogame app will be able to determine the entire outcome of the battle, including the winner and the order in which the tops stopped. Additionally, the videogame app may manage statistics for all players and offer rewards to redeem either in the real world or in the virtual world. The statistics kept may also be transferred to the Cloud for storage, management, including rewards, and use across a network.

Figure 2C:
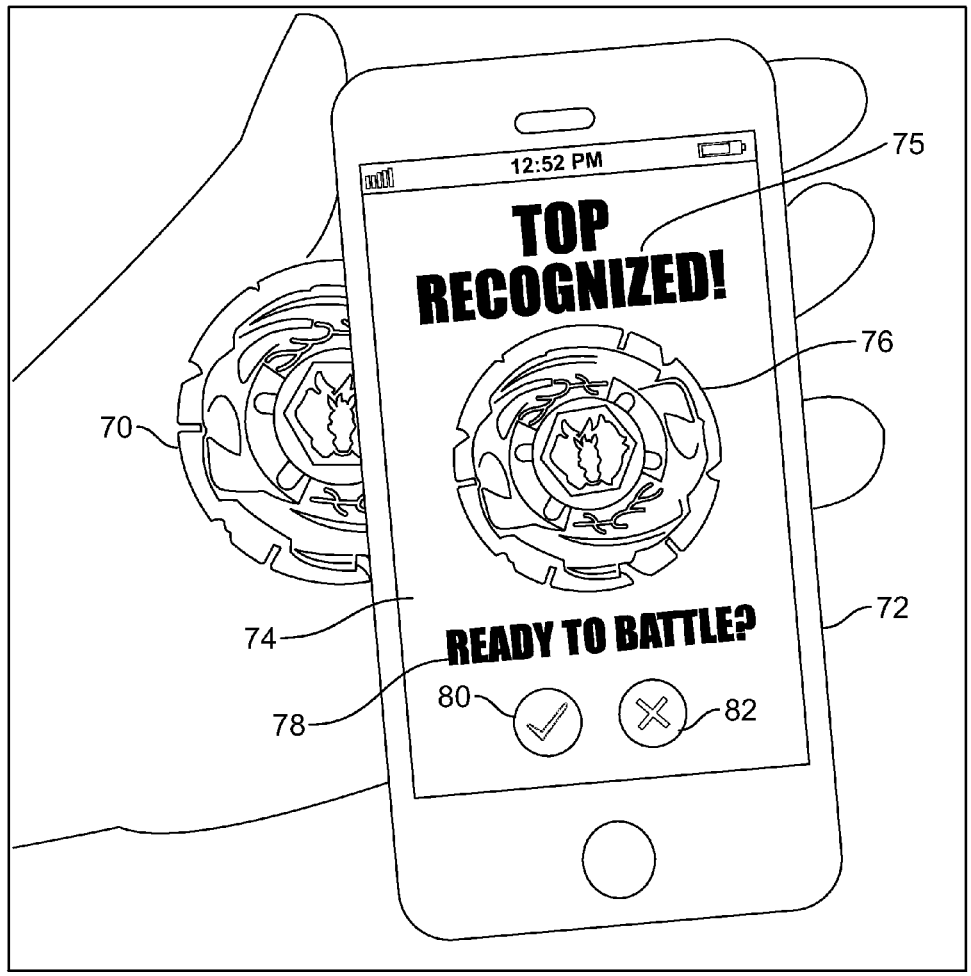
FIG. 2C shows physical toy top recognition on the electronic device when a player returns from playing a physical battle and goes to play a virtual battle.

FIG. 2C shows physical toy top recognition on the electronic device when a player returns from playing a physical battle and goes to play a virtual battle. Once the players have finished the physical battle in the real world, they may return to battle in the virtual world by performing the tapping process described above. That is, each player may take his or her registered physical top 70, with the videogame app running on the electronic device 72, and tap the top on the video screen 74 of the electronic device 72. Because the player has registered the physical top 70, the videogame app recognizes the unique alphanumeric identification and displays a top recognition notice 75 and a recognized top image 76, which is shown as an image of the registered physical top 70 in FIG. 2C. At this point, the player has successfully transferred the Spirit back to the virtual environment. The player is also prompted with a virtual battle inquiry 78 asking the player if he or she wishes to battle in the virtual world. The player may select the virtual battle accept button 80 to play or the virtual battle decline button 82 not to play.

Figure 3:
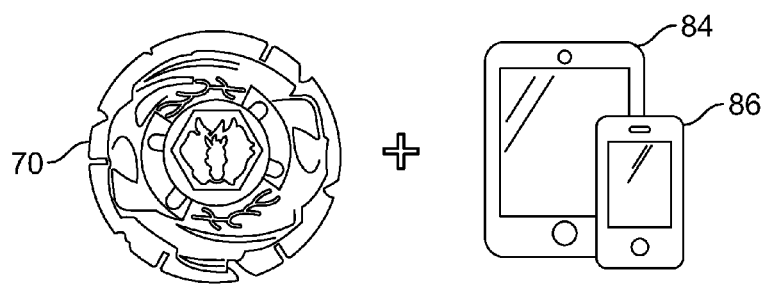
FIG. 3 shows how a player may register a physical top on more than one of the player's electronic devices in the integrated multi-environment game.

FIG. 3 shows how a player may register a physical top on more than one of the player's electronic devices in the integrated multi-environment game. In the described embodiments, a player who has a registered physical top 70, may use the registered physical top 70 on any capable electronic device that the player owns. As shown in FIG. 3, an integrated system may consist of a registered physical top 70, a first registered electronic device 84, and a second registered electronic device 86. This principal may extend so that a registered physical top 70 owner may play on all of that owner's electronic devices. Thus, a player may start playing a virtual battle on the first registered electronic device 84, finish the battle, and tap the registered physical top 70 on the first registered electronic device 84, or the second registered electronic device 86 if allowed by a particular embodiment, to transfer the Spirit, or character, to the registered physical top 70. The player may then play a physical battle with the registered physical top 70, and, when finished, tap the registered physical top 70 on the second registered electronic device 86 to play a virtual battle on the second registered electronic device 86 instead of the first registered electronic device 84.

Figure 4A:
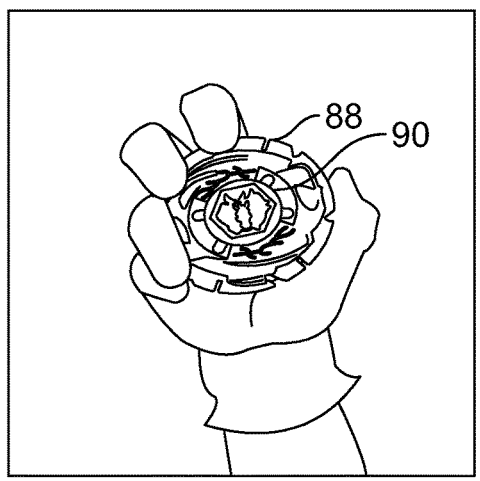
FIG. 4A shows the player beginning the transfer of a spirit, or character persona, from the physical top in the real world environment to the virtual environment through a portal.
Figure 4B:
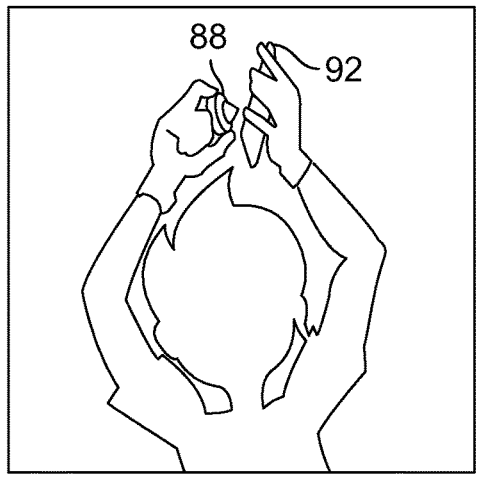
FIG. 4B shows the player actuating the transfer of the spirit, or character persona, from the physical top in the real world environment to the virtual environment through the portal by tapping the physical top to the electronic device.
Figure 4C:
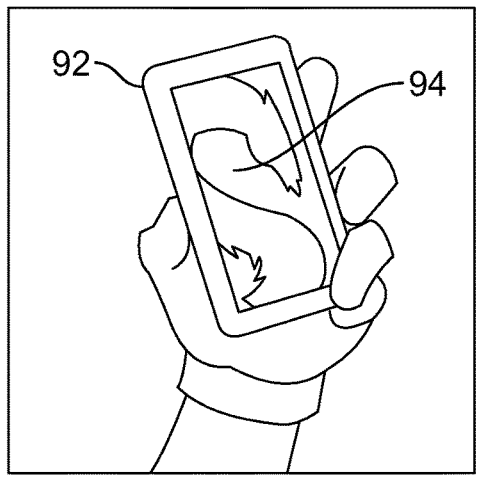
FIG. 4C shows animation indicating that the spirit, or character persona, is traveling through the portal.

FIG. 4A shows the player beginning the transfer of a spirit, or character persona, from the physical top in the real world environment to the virtual environment through a portal. Either at the beginning of play or after a battle in the physical environment, the player will take the physical top chosen for digital battle 88, which contains the spirit character in the physical top 90, and bring it to the player's electronic device. FIG. 4B shows the player actuating the transfer of a spirit, or character persona, from the physical top in the real world environment to the virtual environment through the portal by tapping the physical top to the electronic device. FIG. 4C shows animation indicating that the spirit, or character persona, is traveling through the portal. Once the player has brought physical top chosen for digital battle 88 with the spirit character in the physical top 90 to the player's mobile device 92, the player may tap the physical top chosen for digital battle 88 to the screen of the mobile device 92, and the spirit character in the physical top 90 will transfer into the virtual, or digital, environment. As the spirit character transfers from the physical top chosen for digital battle 88 to the virtual environment, the screen on the mobile device 92 will show an animation 94 indicating that the spirit character is in the process of transferring through the portal from the real environment to the virtual environment. Once the player has completed the transfer of the spirit from the physical top chosen for digital battle 88, the player will be ready to battle in the virtual environment.

Figure 4D:
FIG. 4D shows a virtual environment that the spirit, or character persona, encounters for battle the first time through the portal.
Figure 4E:
FIG. 4E shows a virtual environment that the spirit, or character persona, encounters for battle a subsequent time through the portal.

FIG. 4D shows a virtual environment that the spirit, or character persona, encounters for battle the first time through the portal. After the spirit transfer to the virtual environment, a virtual environment character 96 will appear in the videogame app holding a virtual top with the spirit 98. The virtual environment character 96 will appear in a first virtual environment 100, where the player will battle following a storyline related to the first virtual environment 100. Once the player finishes the battle in the first virtual environment 100, the player may return the spirit character to the physical top by tapping again, or, in some embodiments, the user may progress to another level within the videogame app. FIG. 4E shows a virtual environment that the spirit, or character persona, encounters for battle a subsequent time through the portal. Again, the virtual environment character 96 will appear in a second virtual environment 102, where the player will battle following a storyline related to the second virtual environment 102 and the virtual top with the spirit 98. Once the player finishes the battle in the second virtual environment 102, the player may return the spirit character to the physical top by tapping again, or, in some embodiments, the user may progress to another level within the videogame app.

Figure 5A:
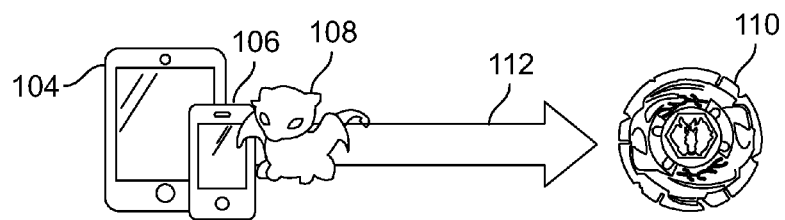
FIG. 5A shows the process of a spirit character transferring from an electronic device to a physical toy.

FIG. 5A shows the process of a spirit character transferring from an electronic device to a physical toy. In this example, a game player may own a tablet computer 104 or a smart phone 106. If the game player has finished battling in virtual world, the game player may use the videogame app in either the tablet computer 104 or the smart phone 106 to transfer the spirit 108 used in the videogame battle back to the physical top 110 from which the spirit 108 originated using the transfer process 112 previously described.

Figure 5B:
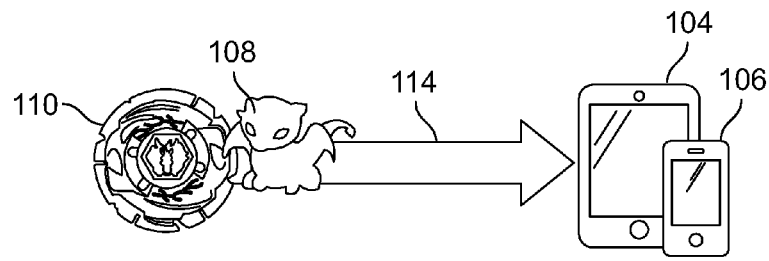
FIG. 5B shows the process of a spirit character transferring from a physical toy to an electronic device.

FIG. 5B shows the process of a spirit character transferring from a physical toy to an electronic device. In this example, a game player may own a tablet computer 104 or a smart phone 106. If the game player has finished battling in physical world, the game player may use the videogame app in either the tablet computer 104 or the smart phone 106 to transfer the spirit 108 used in the physical real world from the physical top 110 to either the tablet computer 104 or the smart phone 106 using the transfer process 114 previously described. The player may then have the spirit for battle in the virtual environment on either the tablet computer 104 or the smart phone 106.

Figure 6A:
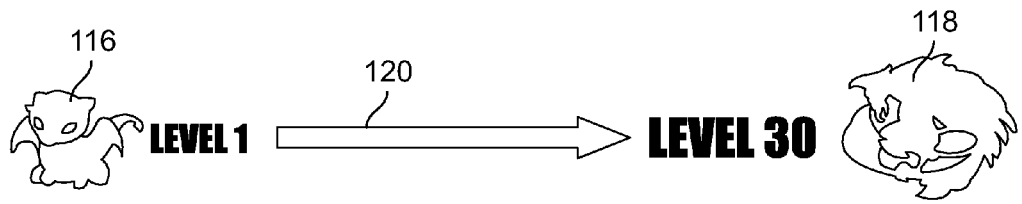
FIG. 6A shows how the character persona evolves during videogame play as the player levels up.

FIG. 6A shows how a spirit character evolves during videogame play as the player levels up. In a described embodiment, when a player starts with a new spirit 116, the new spirit 116 will be have a minimal set of capabilities and will appear as young or undeveloped or having some other characteristic to let the player know that the spirit is new. After the player has gained experience battling and leveled up many times in the virtual environment, the player will experience an evolved spirit 118, which will be fully developed gradually through the intermediate levels 120.

Figure 6B:
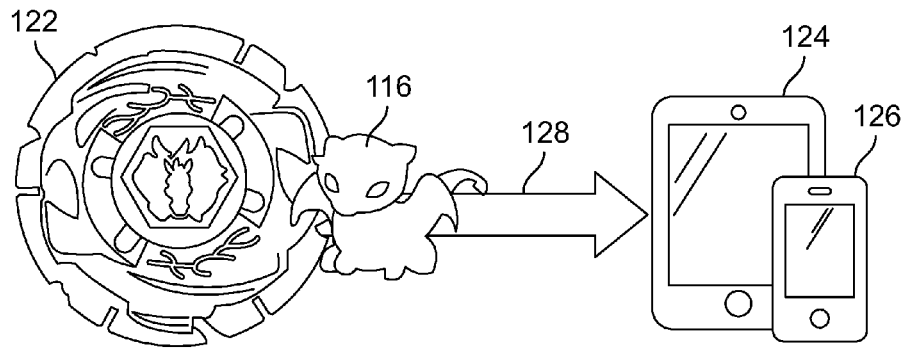
FIG. 6B shows the character persona when first transferred to the virtual environment.

FIG. 6B shows a spirit character when first transferred to the virtual environment. In this example, the player has purchased a new top 122 and owns a tablet without the new spirit 124 and a smart phone without the new spirit 126. The new top 122 contains the new spirit 116, and the player will have a minimal set of capabilities when first transferring the new spirit 116 to the tablet without the new spirit 124 or to the smart phone without the new spirit 126 using the tapping process 128 as described above. In some embodiments, the player will be able to transfer the new spirit 116 to either the tablet without the new spirit 124 or to the smart phone without the new spirit 126 and be able to use the spirit from either the tablet or the smart phone.

Figure 6C:
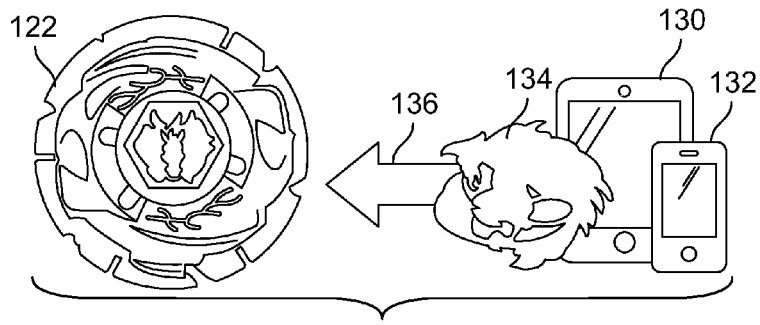
FIG. 6C shows the character persona when transferred from the virtual environment back to the physical toy following leveling up.

FIG. 6C shows the spirit character when transferred from the virtual environment back to the physical toy following leveling up. After the player has battled in the virtual environment and leveled up, the player will have a tablet with the new spirit 130 and a smart phone with the new spirit 132. Because the player has leveled up, the player must transfer the evolved spirit 134 back to the new top 122 using the tapping process 136. The player may initiate the tapping process 136 from either the tablet with the new spirit 130 or the smart phone with the new spirit 132.

Figure 6D:
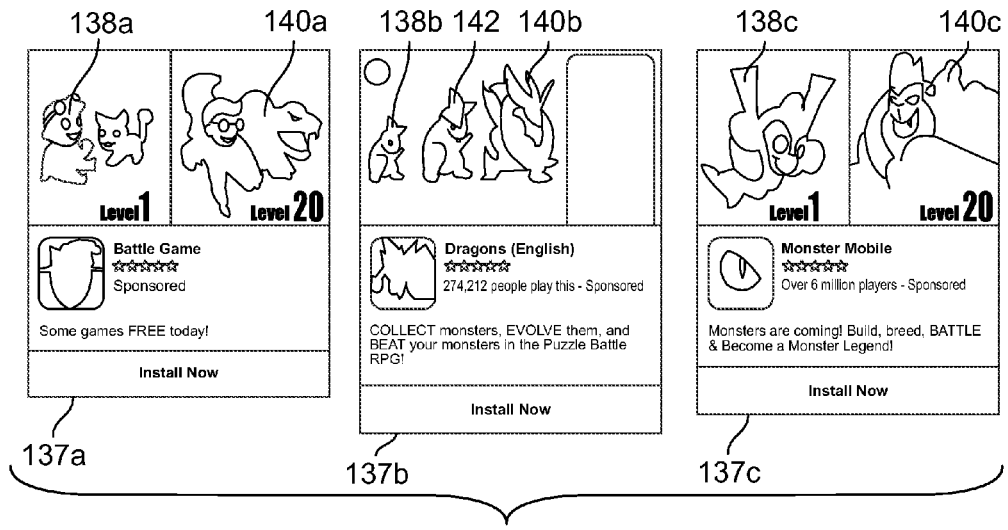
FIG. 6D shows how various character personas evolve during game play.

FIG. 6D shows how various spirit characters evolve during game play. Sample videogame ads 137*a-c* display new spirit characters 138*a-c* as the characters will appear at level 1 and evolved spirit characters 140*a-c* as the characters will appear at the highest level. The center ad shows an example of an intermediately evolved character 142. This demonstrates that the player will transfer the spirit back and forth between the real world and the virtual world several times between level 1 and the highest level.

Figure 7A:
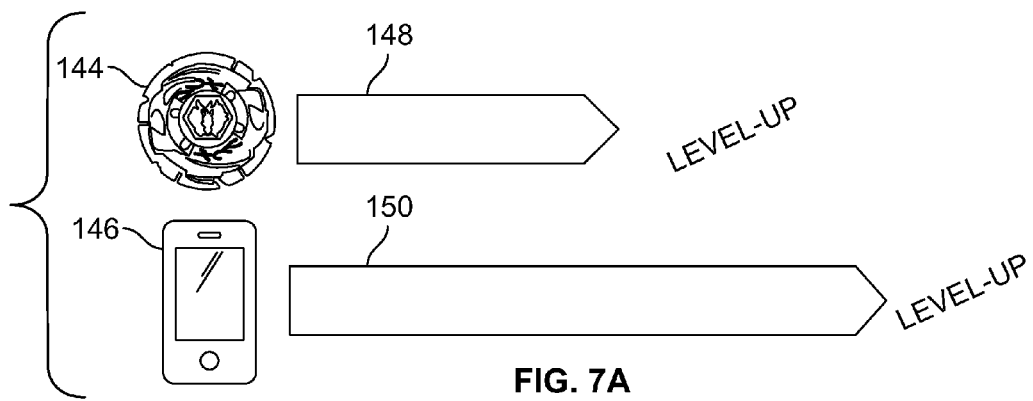
FIG. 7A shows that leveling up may occur from both physical game play and videogame play and that the leveling up may occur at different rates.

FIG. 7A shows that leveling up may occur from both physical game play and videogame play and that the leveling up may occur at different rates. In this specific example, the player may level up from play in the real world and from play in the virtual world, and the real world play representation 144 and the virtual world representation 146 are compared. FIG. 7A shows the amount of time that it takes to reach the same level both in the real world and in the virtual world. Here, the real world play rate 148 is faster that the virtual world play rate 150, and the player will reach higher levels faster from real world play. The ratio of these leveling up rates may be adjusted.

Figure 7B:
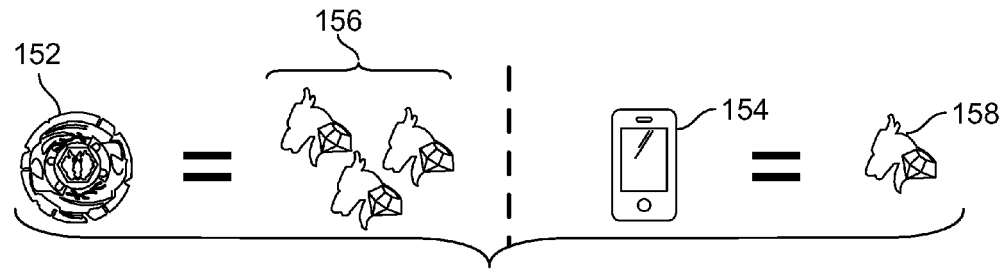
FIG. 7B shows that game currency may be earned from both physical game play and videogame play and that currency may be earned at different rates.

FIG. 7B shows that game currency may be earned from both physical game play and videogame play and that currency may be earned at different rates. In this specific example, the player may earn currency from play in the real world and from play in the virtual world, and the real world play representation 152 and the virtual world representation 154 are compared. FIG. 7B shows the amount of currency that may be earned during a specific amount of playtime in both in the real world and in the virtual world. Here, the real world earning rate 156 is faster that the virtual world earning rate 158, and the player will earn more currency three times faster from real world play. The ratio of these earning rates may be adjusted.

Figure 8:
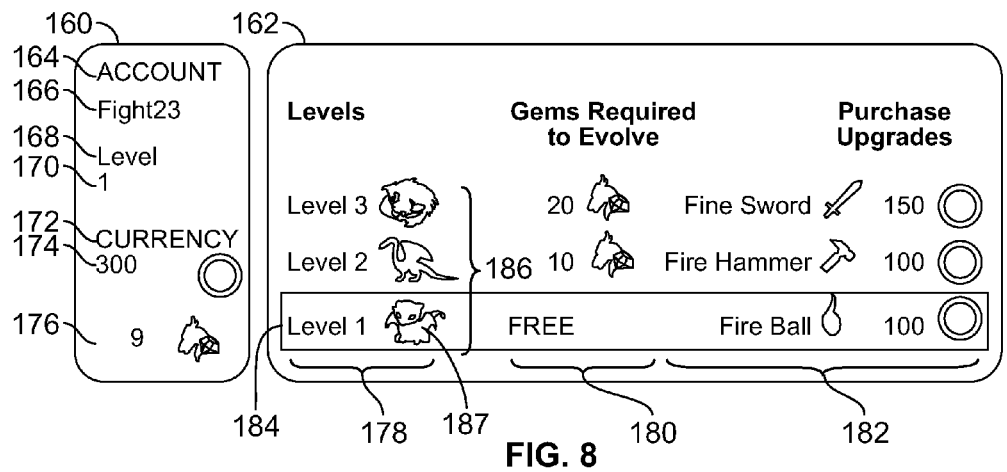
FIG. 8 shows a virtual currency accounting for a player.

FIG. 8 shows a virtual currency accounting for a player. This accounting is presented in two windows, a personal account information window 160 and a needed earnings information window 162. In the personal account information window 160, the player sees an account title section 164, with the current account title 166 directly below. The player also sees a level section 168, with the current level 170 directly below. The player further sees a currency section 172, with the number of points earned 174 and a figure of a coin to show one type of currency, and the number of gems earned 176 and corresponding and corresponding figure to show another type of currency. This and other information may be displayed using various arrangements.

In the needed earnings information window 162 the player sees three columns, a levels column 178, a gems column 180 and an upgrades column 182. The levels column 178 shows the current level row 184 highlighted. In this example, the player is in level one and is shown that entering level 1 is free and requires no gems. The player is also shown that he or she may purchase a Fire Ball on level 1 for 100 coins, or points. The current level row 184 also shows the spirit character at its evolutionary state for that level 187. Likewise, at level 2, the player will be at a different evolutionary state and have a different character, will require ten gems to reach level 2, and may buy a Fire Hammer at level 2 for 100 coins, or points. Similarly, at level 3, the player will be at a different evolutionary state and have a different character, will require twenty gems to reach level 3, and may buy a Fire Sword at level 3 for 150 coins, or points. Other embodiments may use different scenarios and combinations of currency types.

As an added incentive to keep a player playing both in the physical real environment and in the virtual environment, described embodiments may use multipliers to accelerate the rates at which a player earns currency, or points, and increases levels. For example, a player's earned points may grow at rates increased by increasing multiples as the amount of time that the player plays in the virtual environment increases. Likewise, a player's earning power may increase by multiples as the player increases levels to provide a reward for earned experience. Multipliers may also be used to increase points, gems, or levels based on how much a player spends on in-app purchases, how many different tops a player battles against in the physical environment, a promotional offer, etc.

Figure 9:
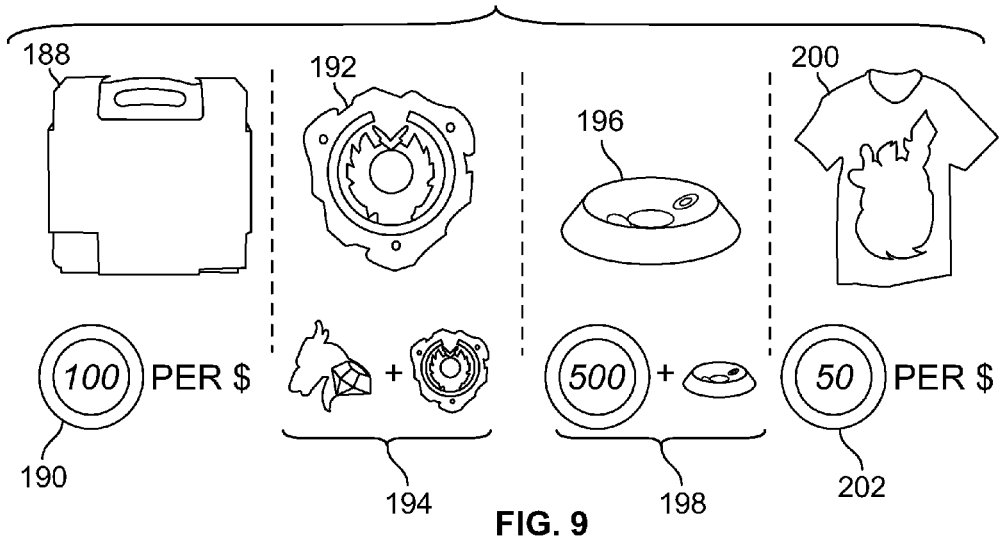
FIG. 9 shows a sample of items that may be purchased online whether in game or not.

FIG. 9 shows a sample of items that may be purchased online whether in game or not. A player may be playing a videogame and decide to make game-related purchases without leaving the videogame application, or the player may decide to make game-related purchases when the player is not playing the videogame. Either way, in the described embodiments, a player may access a webpage to purchase game related products for varying amounts of currency earned within the game. For example, FIG. 9 shows that a player may purchase a physical toy carrying case 188 with related non-NFC toys, which is available at a market price and redeemable at a carrying case currency rate 190 of 100 currency points earned within the game per dollar. Also, a player may purchase a physical top 192, which is available at a market price and redeemable at a physical top currency rate 194 of one gem and one "digital unlock" earned within the game per dollar. A "digital unlock" occurs following a player accomplishing defined achievements within the game. For example, a player may win five virtual battles in a row and digitally unlock a free physical top, which the player may redeem at a physical top currency rate of one gem and the physical top digital unlock. Likewise, a player may purchase an arena 196, which is available at a market price and redeemable at an arena currency rate 198 of five hundred currency points and the arena digital unlock. Further, a player may purchase a T-shirt 200, which is available at a market price and redeemable at a T-shirt currency rate 202 of 50 currency points earned within the game per dollar. Other products, as well as in game resources may also be available in the described embodiments at various, possibly changing, market prices and currency rates.

Figure 10A:
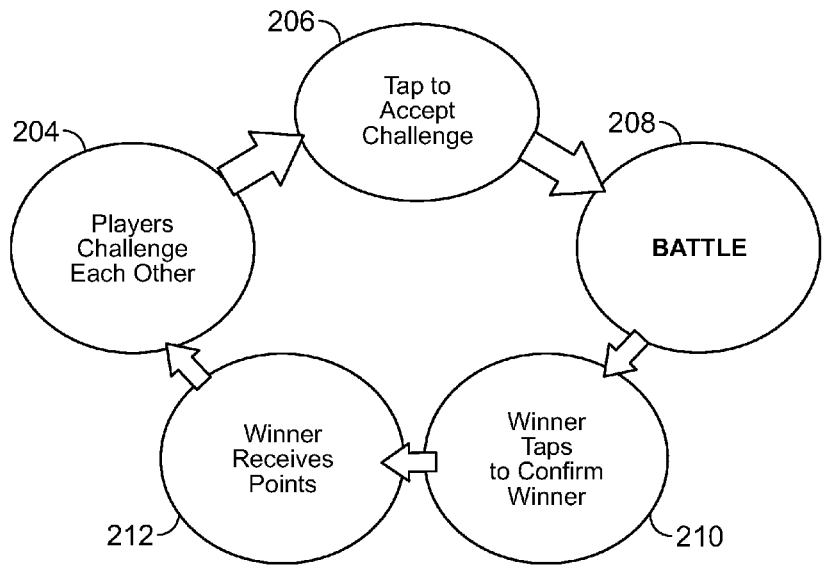
FIG. 10A shows a play loop for the described embodiments.

FIG. 10A shows a play loop for the described embodiments. In step 204, two players, each with their respective electronic devices challenge each other to a physical top battle. In step 206, the players tap their tops to one or more electronic devices to let the videogame app running on those electronic devices identify tops that will battle in the real world. Now the videogame apps running on the one or more electronic devices can keep track of all the NFC enabled tops. In step 208, the physical tops battle, and in step 210, the winner taps the one or more electronic devices to identify the winner of the battle. Likewise, the various videogame apps running on the various electronic devices may keep track of standings for all of the NFC-enabled, registered tops. In step 212, the winner receives points in the winner's account, and the statistics kept on each electronic device are updated. The winner will now have new currency to redeem. After the winner has received points, the loop may return to step 204 for a new challenge.

Figure 10B:
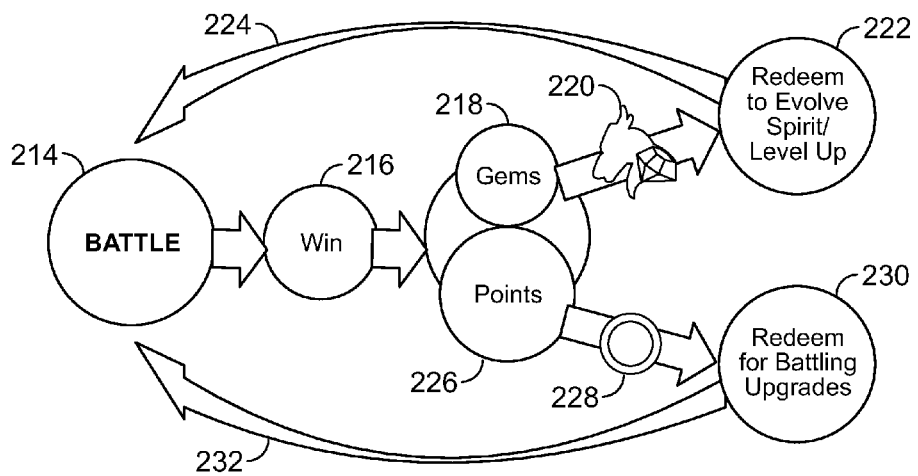
FIG. 10B shows an evolving character loop.

FIG. 10B shows an evolving character loop. In step 214, a player battles in the virtual world either as an initial videogame battle or following a physical top battle. In step 216, the player wins a battle, and, following the battle, in step 218 the player has acquired gems from the victory. In step 220, the player may spend those earned gems from that player's account and redeem the gems to evolve the spirit character in the virtual environment or to level up in step 222. Once the player has either evolved the spirit character in the virtual environment or leveled up, or both, in step 224, the player returns to step 214. Upon this return, the videogame app may allow another virtual battle or instruct the player to tap out and engage in a physical top battle. After step 216, the player has won a battle, and, following the battle, in step 226 the player has acquired points from the victory. In step 228, the player may spend those earned points from that player's account and redeem the points for battle upgrades in the virtual environment, such as virtual weapons, levels, etc. in step 230. Once the player has redeemed points in the virtual environment, in step 232, the player returns to step 214. Upon this return, the videogame app may allow another virtual battle or instruct the player to tap out and engage in a physical top battle.

Figure 11:
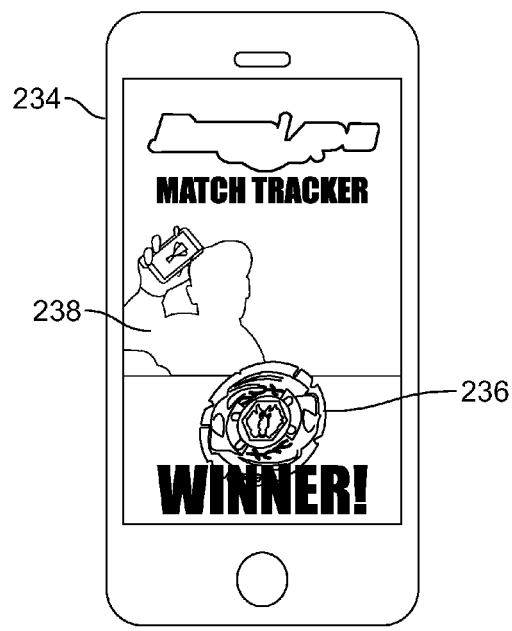
FIG. 11 shows the match tracker of the application on the electronic device declaring a winner of the physical top battle.

The videogame apps in described embodiments may include a match tracker to track a player's matches with other players. Part of the videogame application allows NFC communication between each player's NFC-enabled electronic device and all the NFC-enabled physical tops battling. Following a physical top battle, each videogame application on each respective electronic device will allow the owner of that electronic device to enter the winner and the losers. Thus, the videogame apps on the electronic devices may communicate with each other to check the accuracy of the entered standings. Once the standings are declared accurate, naming a winner is possible. FIG. 11 shows the match tracker of the application on the electronic device declaring a winner of the physical top battle. The winner's electronic device 234 notifies that winner that he or she has won the battle by showing a graphic of the winner's top 236 and the virtual character 238 corresponding to the winner's top. This notification may appear on the winner's electronic device 234 as well as all of the loser's nearby electronic devices that are running the videogame application. Similarly, the match tracker may extend over a larger network.

For many of the interactions embodied above, players must have opened accounts and registered their physical tops so that those players may enjoy all of the benefits offered by described embodiments. Because of the NFC capabilities of the physical tops and the players' electronic devices, in embodiments where the electronic devices have Cloud access, a player may cause physical top registration simply by tapping the top to the electronic device running the videogame application and having the videogame application recognize the physical top and proceed with the registration. These capabilities, however, present a unique problem. A player who has an account may walk into a store with his or her electronic device, with the videogame application running, and register one or more physical tops simply by walking near the physical tops for sale. This would allow the player access to the videogame application allowed for the registered tops to a certain point in the game. However, the player may do this for every physical top on the shelf in the store. Even worse, once the unsold physical tops are sold, the purchaser will not be able to register and use the virtual environment features of the purchased tops because those tops will have already registered the unique alphanumeric identification.

To alleviate this problem, described embodiments may have a special trial mode and bonding feature. With this feature, when the player taps a physical top on an electronic device running the videogame application for the first time, the videogame application will check to see if the physical top is already associated with an account in the Cloud. If the physical top has not been registered to an account, the videogame application in the player's electronic device will showcase the spirit character belonging with the physical top in a trial mode.

Trial mode is a process that presents a story in the videogame app where the player learns about spirits and attempts to earn their trust through videogame play. The purpose of trial mode is to deter players from registering the physical tops by using the codes without purchasing the physical tops.

In the trial mode story, each spirit character is a young creature when it is first introduced to a player. In the defined videogame world, people are trainers. Before a spirit character may bond with a trainer, the player will experience a trial mode where the player will need to prove the player's worth to the spirit character and earn the spirit character's trust.

From the player's perspective, after the player taps the physical top to the electronic device for the first time, the player will receive a prompt from the videogame application of the electronic device informing the player that the spirit is in trial mode until the spirit is ready to bond with the player. During trial mode, the player may play with the character in the virtual environment for a short gaming session. During this short gaming session, the videogame application will ask the player to complete several tasks in the virtual environment. Following the short gaming session and the completed tasks, the trial mode portion of the videogame application will ask the player to send the spirit back to the physical top. Once the player taps the physical top, which may still be un-purchased, and sends the spirit back to the physical top, the videogame application in the electronic device, and on all other electronic devices registered to the same account in some embodiments, will rest for one hour. Other rest periods are possible. After the resting time, the player may tap the physical top again to bring the spirit back into the videogame application on the player's electronic device. The trial sessions should be long enough to allow store personnel to spot a loiterer. Furthermore, registrations should not be allowed until the full bonding session is completed in one session by one player. Because those who will register physical tops without purchasing the tops will not be able to loiter in a store for more than an hour, the problems associated with players registering un-purchased physical tops are solved. If the player fails to complete the trial session within a set time or in one sitting, then the trial mode exits.

Once the player has completed the trial mode, the player will receive a message from the videogame application alerting him or her that the spirit is ready to bond with the player permanently. In the described embodiments, bonding equals registration. Once the player chooses to bond, the player's purchased physical top will register automatically to the player's account through the videogame application on the player's electronic device.

By registering a physical top with a player's account, the player may use the registered physical top with other electronic devices without having to use a sign-on process. This feature will allow live head-to-head battling with other players and saving friends to a friends list. The videogame applications running on each player's electronic devices will be able to verify that the opponents are using registered physical tops by checking a list on the player's electronic device(s) in some embodiments and by checking master registration logs in the Cloud in other embodiments.

Figure 12:
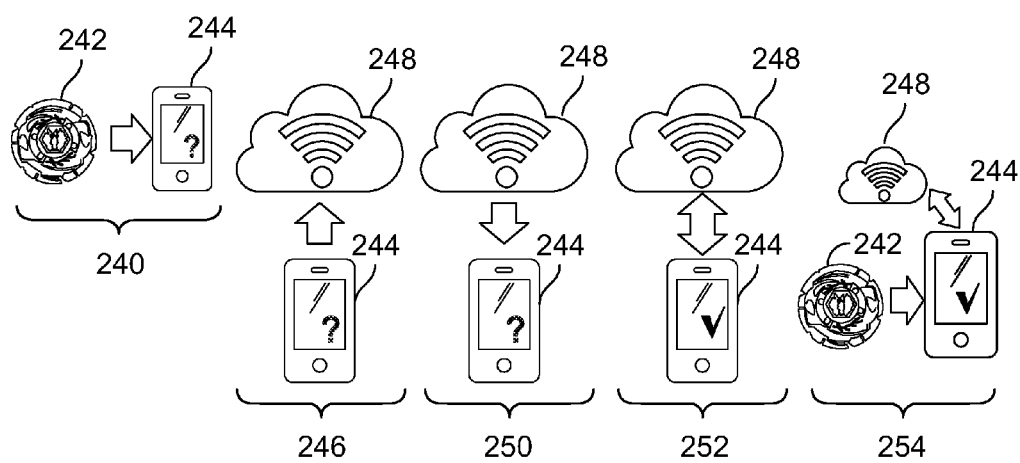
FIG. 12 shows the process of registering a uniquely identifiable top using the Cloud.

FIG. 12 shows the process of registering a uniquely identifiable top using the Cloud. In step 240, the player places the NFC-enabled physical top 242 in proximity to the NFC reading electronic device 244. In step 246, the electronic device 244 pings a Cloud server 248 to see if the NFC-enabled physical top 242 has been registered. In step 250, the top has not been registered as reported from the Cloud server 248, and the videogame application in the electronic device 244 will prompt the player to engage in the bonding play loop. During the bonding play loop in the trial mode, the videogame application will allow the player to play temporarily with spirit in the virtual environment and perform several activities within an hour long session. Sessions of other lengths may be used, but the time period should be long enough to allow store personnel to spot a loiterer. Furthermore, registrations should not be allowed until the full bonding session is completed in one session by one player.

After the player has concluded the trial mode, or bonding, the videogame application will ask the player to tap the NFC-enabled physical top 242 to send the spirit back to the NFC-enabled physical top 242. Digital play with the spirit in the virtual environment will be inaccessible for an hour, although other time periods may be used. After the hour, or other length rest session, the videogame application will prompt the player to tap the physical top to the electronic device 244 to transfer the spirit back to the videogame application.

In step 252, once the spirit is back in the virtual environment, the electronic device 244 will ping the Cloud server 248 to confirm that the physical top has successfully completed the bonding play loop and that the physical top has been registered to the player's account. In step 254, with the registration complete, it is shown that each time the player brings the NFC-enabled physical top 242 in close proximity to an NFC-enabled electronic device 244 running the videogame application, the videogame application will recognize the NFC-enabled physical top 242 and that it is registered to the player's account.

Figures 13A, 13B:
FIG. 13A shows an example of a current online ranking system at the top of the leader board with a first sample set of statistics.
FIG. 13B shows an example of a current online ranking system, and the player is shown in his position with a second sample set of statistics.

FIG. 13A shows an example of a current online ranking system at the top of the leader board with a first sample set of statistics. In this embodiment, the top of the leader board 256 shows someone other than the player in first place and on level 33. FIG. 13B shows an example of a current online ranking system, and the player is shown in his position with a second sample set of statistics. The player's position on the leader board 258 is shown with a rank of 4452 even though the player is on level 21. Although the level may seem like the player has accomplished a lot, a discouraged player who has viewed the standings 260 will feel helpless if that player wants to approach the top of the leader board. The player will feel as if he or she is against the world. It will take many hours for one to gain a meaningful ranking Newcomers will have no incentive to increase their scores. Thus, the online ranking system shown reduces player incentive and is not an effective retention driver.

Figure 14:
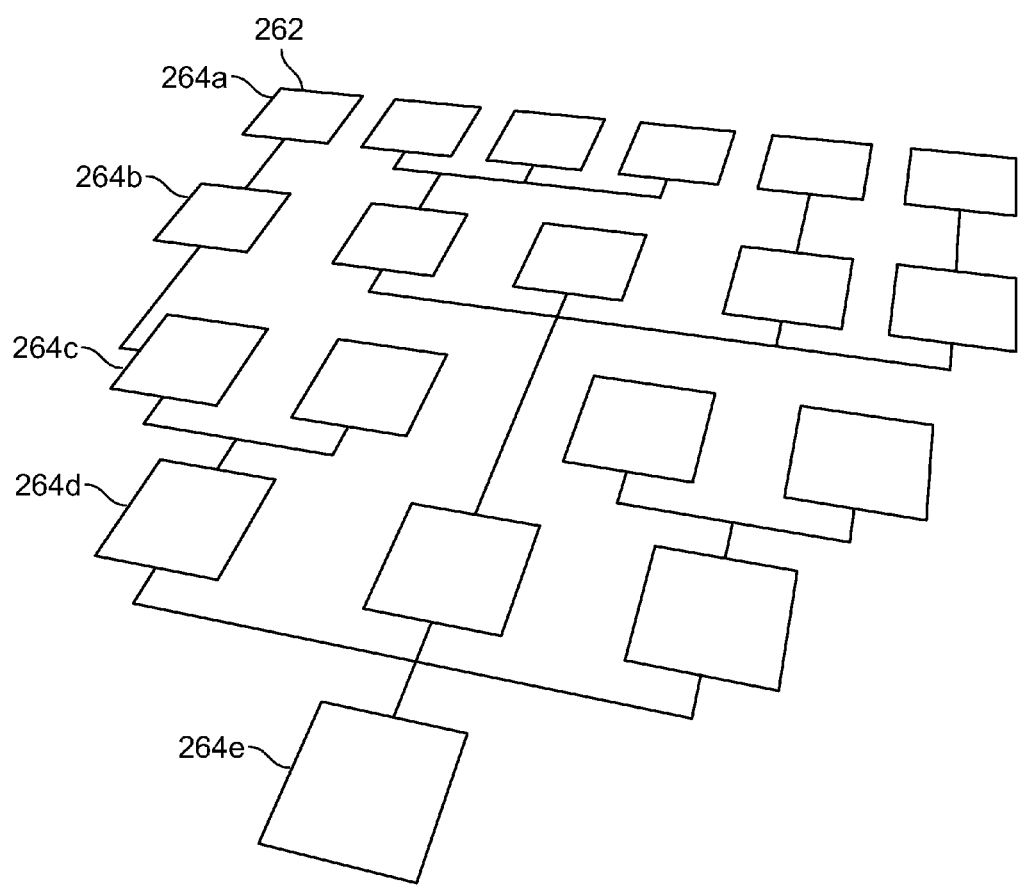
FIG. 14 shows a model of an online ranking system that will not reduce player incentive.

FIG. 14 shows a model of an online ranking system that will not reduce player incentive. In this model, players may create their own groups based on their friends instead on thousands of anonymous other players. A sample friends group 262 is shown as a box in FIG. 14. Additionally, friends groups may be arranged based on skill to encourage continued play incentives for someone to play more often and to play a wider range of other players without feeling overwhelmed. Skill levels 264a-e show how the groups of friends at similar levels may be arranged to drastically reduce the number of people against whom the player competes directly. Thus, an aspiring, improving player may play to the best of his or her ability and feel competitive all the time.

Figure 15:
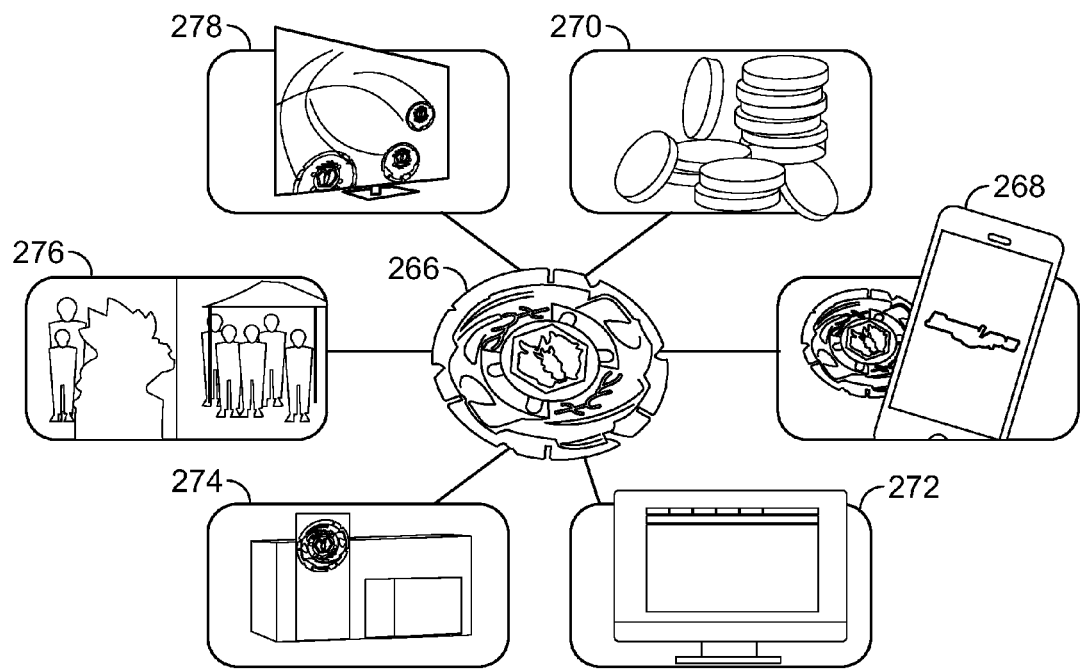
FIG. 15 shows the media and gaming ecosystem of a described embodiment.

FIG. 15 shows the media and gaming ecosystem of a described embodiment. In this embodiment, the NFC-enabled physical top 266 provides the centerpiece of the ecosystem. Connected to the centerpiece are various media and gaming elements that relate to and rely on the spirit character associated with each NFC-enabled physical top 266. These media and gaming elements include a videogame app 268 used as defined above, virtual currency 270 used as defined above, web access 272 as defined above for gaming, tracking, shopping, etc., and further as the field of the described embodiments develops, a retail store 274 to buy physical, related products, marketing and events 276 featuring the characters and the products and competitors, etc., and television 278, including programs related to the characters and competitions, etc.

Figure 16:
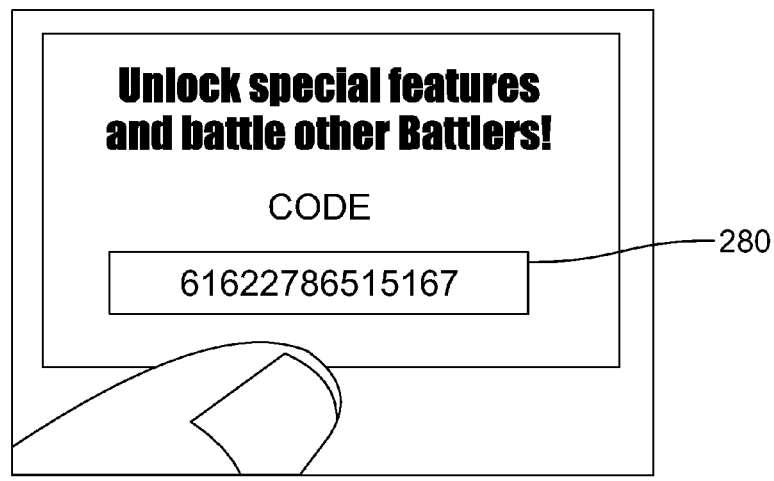
FIG. 16 shows that an alphanumeric code may be typed to register a new top.

FIG. 16 shows that an alphanumeric code may be typed to register a new top. In the event that the NFC communication fails during registration or account setup, the packaging in which the top is purchased may include an alphanumeric code 280 that may be typed on the website associated with the videogame application registration. Additionally, in some embodiments, a scannable code, such as a bar code or a QR code may be used to register a top or to establish an account instead of the code that may be typed.

While the present inventions have been illustrated by a description of various embodiments and while these embodiments have been set forth in considerable detail, it is intended that the scope of the inventions be defined by the appended claims. It will be appreciated by those skilled in the art that modifications to the foregoing preferred embodiments may be made in various aspects. It is deemed that the spirit and scope of the inventions encompass such variations to be preferred embodiments as would be apparent to one of ordinary skill in the art and familiar with the teachings of the present application.

What is claimed is:

1. A gaming system for integrated computer-related and physical game play interactions comprising:
    a physical game piece comprising:
        a unique alphanumeric identifier; and
        a first signal transmitter configured to transmit the unique alphanumeric identifier; and
    an electronic device comprising:
        a first signal receiver configured to receive the signal transmitted from the first signal transmitter;
        an input interface configured to receive user input; and
        a game application in communication with the first signal receiver and the input interface and responsive to signals received by the first signal receiver and to user input from the input interface comprising:
        a table of known unique alphanumeric identifiers;
        a digital portal interface responsive to signals received by the first signal receiver and configured to receive the unique alphanumeric identifier, to query the table to match the unique alphanumeric identifier to a table element, and to enter a trial mode game application if the queried unique alphanumeric identifier was not found, in which the player is required to complete tasks within an allotted time period and the player is required to exit the trial mode if the player fails to complete the tasks within the allotted time period; and to generate output when the unique alphanumeric identifier matches a table element; and
        a two-state digital game environment that toggles between states in response to the digital portal output comprising:
            a first-state program module that waits for the digital portal output allotting time for play with the physical game piece and that switches to a known second-state program module upon receiving the digital portal output; and a second-state program module comprising:
a digital character uniquely associated with the unique alphanumeric identifier; and
a plurality of sequentially accessible gaming program modules wherein a user may accumulate a game score and with respectively sequential levels of increasing difficulty featuring the digital character in the digital game environment with the digital character and the digital environment responsive to user input through the input interface where the second-state program module switches to the first-state program module upon receiving digital portal output and where the user accesses the sequentially accessible gaming program modules and increases the difficulty level and the accumulated game score based on the quantity of digital portal output and the quantity and pattern of user input.

2. The gaming system recited in claim 1 wherein the game application further comprises a multiplier program module in communication with the first-state program module and the second-state program module that multiplies one or more of the difficulty level and the accumulated game score by a predetermined multiple based on the quantity of digital portal output and the quantity and pattern of user input.

3. The gaming system recited in claim 1 further comprising a physical game board in communication with the physical game piece comprising:
a game piece movement detector comprising:
a second signal receiver in communication with the first signal transmitter that receives a unique alphanumeric identifier from the physical game piece when the game piece is on the physical game board; and
a motion sensor in communication with the second signal receiver that determines whether or not the physical game piece having the unique alphanumeric identifier is moving on the physical game board; and
a second signal transmitter in communication with the game piece movement detector that transmits the unique alphanumeric identifiers detected and whether the physical game piece associated with the unique alphanumeric identifier is moving.

4. The gaming system recited in claim 3 with the electronic device further comprising:
a first memory configured to store a list with each list item comprising the unique alphanumeric identifier, a motion indicator that indicates whether or not the physical game piece having the particular unique alphanumeric identifier is moving, the accumulated game score for the physical game piece having the particular unique alphanumeric identifier and the difficulty level for the physical game piece having the particular unique alphanumeric identifier; and
a game piece identification and movement detection program module in communication with the second signal transmitter, the second-state program module, and the first memory that in real-time reads the unique alphanumeric identifiers detected and the associated motion indicators from the second signal transmitter and the accumulated game scores and the difficulty levels for each unique alphanumeric identifier from the second-state program module and writes the unique alphanumeric identifiers detected, the associated motion indicators, the accumulated game scores and the difficulty levels to the first memory.

5. The gaming system recited in claim 4 with the electronic device further comprising:
a user interface in communication with the input interface configured to allow a user to input one of a plurality of game results and associate the game result with a unique alphanumeric identifier; and
a game result conversion program module in communication with the user interface and the first memory configured to translate the game result into additional points to add to the accumulated game score associated with the unique alphanumeric identifier in the first memory.

6. The gaming system recited in claim 5 further comprising a network comprising a remotely connected network-based gaming system management program module in communication with the first memory.

7. The gaming system recited in claim 6 wherein the game application further comprises a multiplier program module in communication with the first-state program module and the second-state program module that multiplies one or more of the difficulty level and the accumulated game score by a predetermined multiple based on the quantity of digital portal output and the quantity and pattern of user input.

8. The gaming system recited in claim 6 with the network further comprising a connected network site configured to let users make in-application purchases.

9. The gaming system recited in claim 8 wherein the user may use points in the accumulated game score as a first currency to purchase game elements for the digital character to use in the digital environment and wherein the user may further earn a second currency from increasing difficulty levels.

10. The gaming system recited in claim 6 wherein the network-based gaming system management program further comprises an account management tool to allow users of the network to open an account to allow the electronic device from one gaming system to recognize the physical game piece of a different gaming system.

11. The gaming system recited in claim 1 wherein the digital character evolves as the difficulty level increases.

12. The gaming system recited in claim 1 wherein the first-state program module further comprises a display and wherein the display shows story elements related to the digital character and the digital environment while the first-state program module waits for digital port output.

13. The gaming system recited in claim 1 further comprising the digital portal interface further configured to generate a friends list comprising the unique alphanumeric identifiers of the physical game pieces received by the first signal receiver.

14. The gaming system recited in claim 1 wherein the user may use points in the accumulated game score as a first currency to purchase game elements for the digital character to use in the digital environment and wherein the user may further earn a second currency from increasing difficulty levels.

15. A gaming system for integrated computer-related and physical game play interactions comprising:
a physical game piece comprising:
a unique alphanumeric identifier; and
a first signal transmitter configured to transmit the unique alphanumeric identifier; and an electronic device comprising:
  a first signal receiver configured to receive the signal transmitted from the first signal transmitter;
  an input interface configured to receive user input; and
  a game application in communication with the first signal receiver and the input interface and responsive to signals received by the first signal receiver and to user input from the input interface comprising:
    a table of known unique alphanumeric identifiers;
    a digital portal interface responsive to signals received by the first signal receiver and configured to receive the unique alphanumeric identifier, to query the table to match the unique alphanumeric identifier to a table element, and to enter a trial mode game application if the queried unique alphanumeric identifier was not found, in which the player is required to complete tasks within an allotted time period and the player is required to exit the trial mode if the player fails to complete the tasks within the allotted time period; and to generate output when the unique alphanumeric identifier matches a table element; and
    a two-state digital game environment that toggles between states in response to the digital portal output comprising:
      a first-state program module that waits for the digital portal output allotting time for play with the physical game piece and that switches to a known second-state program module upon receiving the digital portal output; and
      a second-state program module comprising:
        a digital character uniquely associated with the unique alphanumeric identifier;
        a plurality of sequentially accessible gaming program modules wherein a user may accumulate a game score and with respectively sequential levels of increasing difficulty featuring the digital character in the digital game environment with the digital character and the digital environment responsive to user input through the input interface where the second-state program module switches to the first-state program module upon receiving digital portal output and where the user accesses the sequentially accessible gaming program modules and increases the difficulty level and the accumulated game score based on the quantity of digital portal output and the quantity and pattern of user input;
a physical game board in communication with the physical game piece comprising:
  a game piece movement detector comprising:
    a second signal receiver in communication with the first signal transmitter that receives a unique alphanumeric identifier from the physical game piece when the game piece is on the physical game board; and
    a motion sensor in communication with the second signal receiver that determines whether or not the physical game piece having the unique alphanumeric identifier is moving on the physical game board; and
  a second signal transmitter in communication with the game piece movement detector that transmits the unique alphanumeric identifiers detected and whether the physical game piece associated with the unique alphanumeric identifier is moving; and a multiplier program module in communication with the first-state program module and the second-state program module that multiplies one or more of the difficulty level and the accumulated game score by a predetermined multiple based on the quantity of digital portal output and the quantity and pattern of user input.

16. The gaming system recited in claim 15 with the electronic device further comprising:
  a first memory configured to store a list with each list item comprising the unique alphanumeric identifier, a motion indicator that indicates whether or not the physical game piece having the particular unique alphanumeric identifier is moving, the accumulated game score for the physical game piece having the particular unique alphanumeric identifier and the difficulty level for the physical game piece having the particular unique alphanumeric identifier;
  a game piece identification and movement detection program module in communication with the second signal transmitter, the second-state program module, and the first memory that in real-time reads the unique alphanumeric identifiers detected and the associated motion indicators from the second signal transmitter and the accumulated game scores and the difficulty levels for each unique alphanumeric identifier from the second-state program module and writes the unique alphanumeric identifiers detected, the associated motion indicators, the accumulated game scores and the difficulty levels to the first memory;
  a user interface in communication with the input interface configured to allow a user to input one of a plurality of game results and associate the game result with a unique alphanumeric identifier; and
  a game result conversion program module in communication with the user interface and the first memory configured to translate the game result into additional points to add to the accumulated game score associated with the unique alphanumeric identifier in the first memory.

17. The gaming system recited in claim 16 further comprising a network comprising a remotely connected network-based gaming system management program module in communication with the first memory.

18. The gaming system recited in claim 17 wherein the network-based gaming system management program further comprises an account management tool to allow users of the network to open an account to allow the electronic device from one gaming system to recognize the physical game piece of a different gaming system.

19. The gaming system recited in claim 15 wherein the digital character evolves as the difficulty level increases.

20. A method for registering a game piece comprising:
  providing a physical game piece comprising:
    providing a unique alphanumeric identifier;
    providing a first signal transmitter; and
    transmitting the unique alphanumeric identifier from the first signal transmitter; and
  providing an electronic device comprising:
    providing a first signal receiver;
    receiving the signal transmitted from the first signal transmitter;
    providing a network interface to a remote location configured to query remote registration information containing previously registered unique alphanumeric identifiers and to return data indicating whether the queried unique alphanumeric identifier was found or was not found;
querying the network interface with the received signal;
receiving a response from the network interface;
entering a trial mode game application if the queried unique alphanumeric identifier was not found comprising:
  requiring the player to complete tasks within an allotted time period;
  exiting the trial mode if the player fails to complete the tasks within the allotted time period; and
  instructing the player to do something to have the physical game piece transmit the unique alphanumeric identifier if the player completes the tasks within an allotted time period;
resting for a specified period;
registering the unique alphanumeric identification number; and
playing a videogame if the queried unique alphanumeric identifier was found and after the alphanumeric identification number is registered.

\* \* \* \* \*